Aug. 23, 1932.   F. FLECKENSTEIN ET AL   1,873,834
SUPPORT FOR ELECTRIC DISCHARGE DEVICES
Filed March 27, 1929

Inventors:
Florian Fleckenstein,
Gustav W. Müller,
by Charles E. Tullar
Their Attorney.

Patented Aug. 23, 1932

1,873,834

UNITED STATES PATENT OFFICE

FLORIAN FLECKENSTEIN, OF PANKOW, AND GUSTAV W. MÜLLER, OF CHARLOTTENBURG, GERMANY, ASSIGNORS TO GENERAL ELECTRIC COMPANY, A CORPORATION OF NEW YORK

SUPPORT FOR ELECTRIC DISCHARGE DEVICES

Application filed March 27, 1929, Serial No. 350,359, and in Germany May 1, 1928.

Our invention relates to supports for electric discharge devices, such as mercury arc rectifiers for example, and has for its principal object the provision of an improved support which will absorb substantially all vibrations which would otherwise be imparted to the device.

Mercury arc rectifiers are often exposed to considerable vibration when mounted on locomotives or other vehicles. These vibrations may cause unstable operation of the rectifier, and in the case of glass rectifiers may injure the walls thereof by causing the mercury to strike against them. In accordance with our invention this difficulty is overcome by the provision of an improved support which includes a frame resiliently supported at a plurality of points by groups of counteracting springs, in which each spring is arranged to have a natural period of vibration different from that of any other spring in the same group.

Our invention will be better understood from the following description when considered in connection with the accompanying drawing and its scope will be pointed out in the appended claims.

Figure 1:
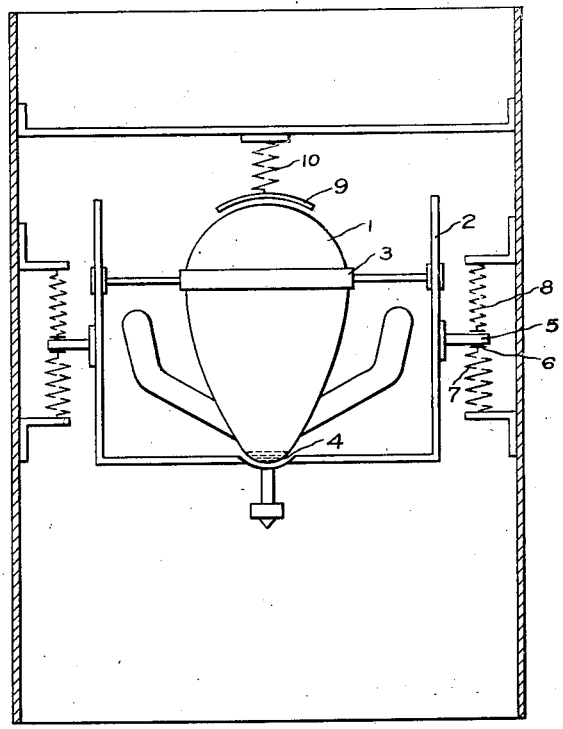
Figure 2:
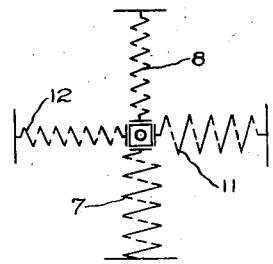

Referring to the drawing, Fig. 1 illustrates a mercury arc rectifier mounted upon a support built in accordance with my invention; and Fig. 2 illustrates a detail thereof.

Fig. 1 illustrates a mercury arc rectifier 1 which is mounted on a frame 2, being supported thereby at points 3 and 4. The frame 2 is in turn supported by two studs 5 which are placed upon opposite sides of the frame 2 in such manner that the rectifier may be suspended thereby in its operating position. The studs 5 are respectively mounted within bearings each of which is supported by a group of four equally spaced counteracting springs 7, 8, 11 and 12. The resonant vibrating frequency of each of the springs differs from that of the other springs in the group.

If for some reason the rectifier should be set into violent oscillations, a spring 10 whose natural period of vibration is different from those of the above mentioned springs is arranged to support a plate 9 above the rectifier 1 and normally out of contact therewith. If the rectifier oscillations exceed a predetermined magnitude, the top of the rectifier will come in contact with this plate and lift it against the pressure of the spring 10. A gradual damping is thereby obtained which guards against oscillations not taken care of by the springs acting upon the studs 5.

In a support of this type it is possible to so arrange the natural period of vibration of the springs that the resultant period of the whole support is remote from that of any vibration that the rectifier may be exposed to when installed.

What we claim as new and desire to secure by Letters Patent of the United States, is:

1. An electric discharge device support including a movable frame upon which said device is mounted, two suspension studs mounted upon said movable frame at two opposite sides thereof to suspend said device in its operating position, a rigid frame having two oppositely disposed side members, and means to support said movable frame resiliently within said rigid frame and to damp vibration of said movable frame and said device, said means including two groups of springs, one of said groups being constituted by four springs attached at their inner ends to one of said suspension studs and at their outer ends to one side of said rigid frame, the other of said groups being constituted by four springs attached at their inner ends to the other of said suspension studs and at their outer ends to the opposite side of said rigid frame, the four springs of each group being spaced at 90° intervals in the vertical plane about the corresponding suspension stud, the resonant frequency of each spring of a group being different from that of all other members of the group.

2. An electric discharge device support including a movable frame upon which said device is mounted, two suspension studs mounted upon said movable frame at two opposite sides thereof to suspend said device in its operating position, a rigid frame having two oppositely disposed side members and a top member, means to support said movable frame resiliently within said rigid frame and to damp vibration of said movable frame and said device, said means including two groups of springs, each of said groups being constituted by four springs attached at their inner ends to a different one of said suspension studs and at their outer ends to a different one of said sides of said rigid frame, the four springs of each group being spaced at 90° intervals in the vertical plane about the corresponding suspension stud, the resonant frequency of each spring of a group being different from that of all other members of the group, and a spring mounted on said top member of said rigid frame and normally out of contact with said device, said last-named spring being adapted to come into contact with said device upon occurrence of excessive vibration thereof to damp said excessive vibration, the resonant frequency of said last-named spring being different from that of any of the members of said groups of springs.

In witness whereof we have hereunto set our hands this 12th day of March, 1929.

FLORIAN FLECKENSTEIN.
GUSTAV W. MÜLLER.